Sept. 13, 1949.  E. P. PHILKOFF  2,481,947
CORN-CLIPPING APPARATUS
Filed April 19, 1946  3 Sheets-Sheet 1
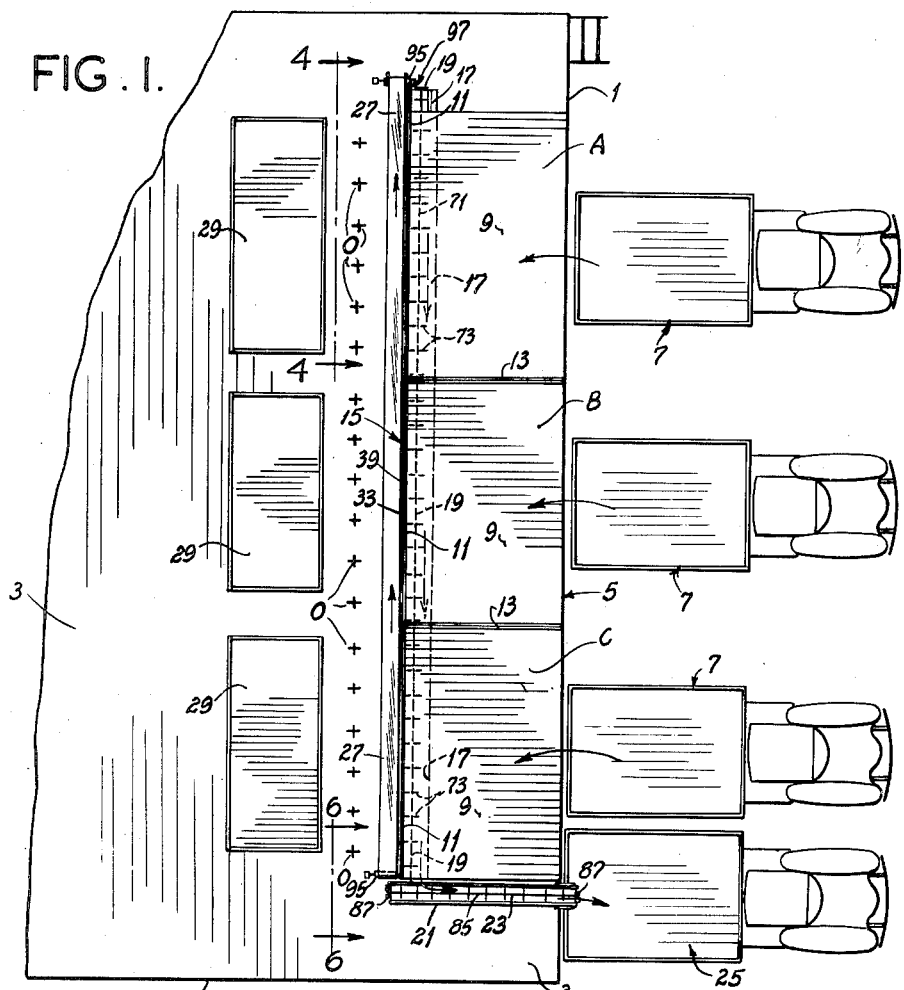
FIG. 1.
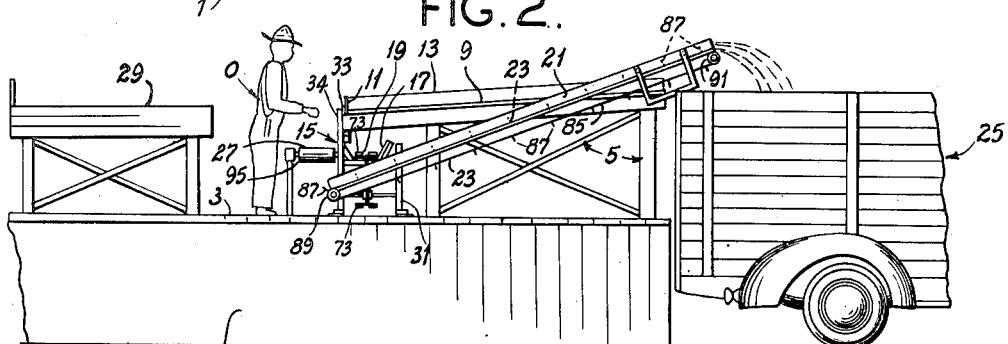
FIG. 2.
Eftim P. Philkoff
Inventor.
Haynes and Koenig
Attorneys.

Sept. 13, 1949.  E. P. PHILKOFF  2,481,947
CORN-CLIPPING APPARATUS
Filed April 19, 1946  3 Sheets-Sheet 2

Eftim P. Philkoff,
Inventor.
Haynes and Koenig
Attorneys.

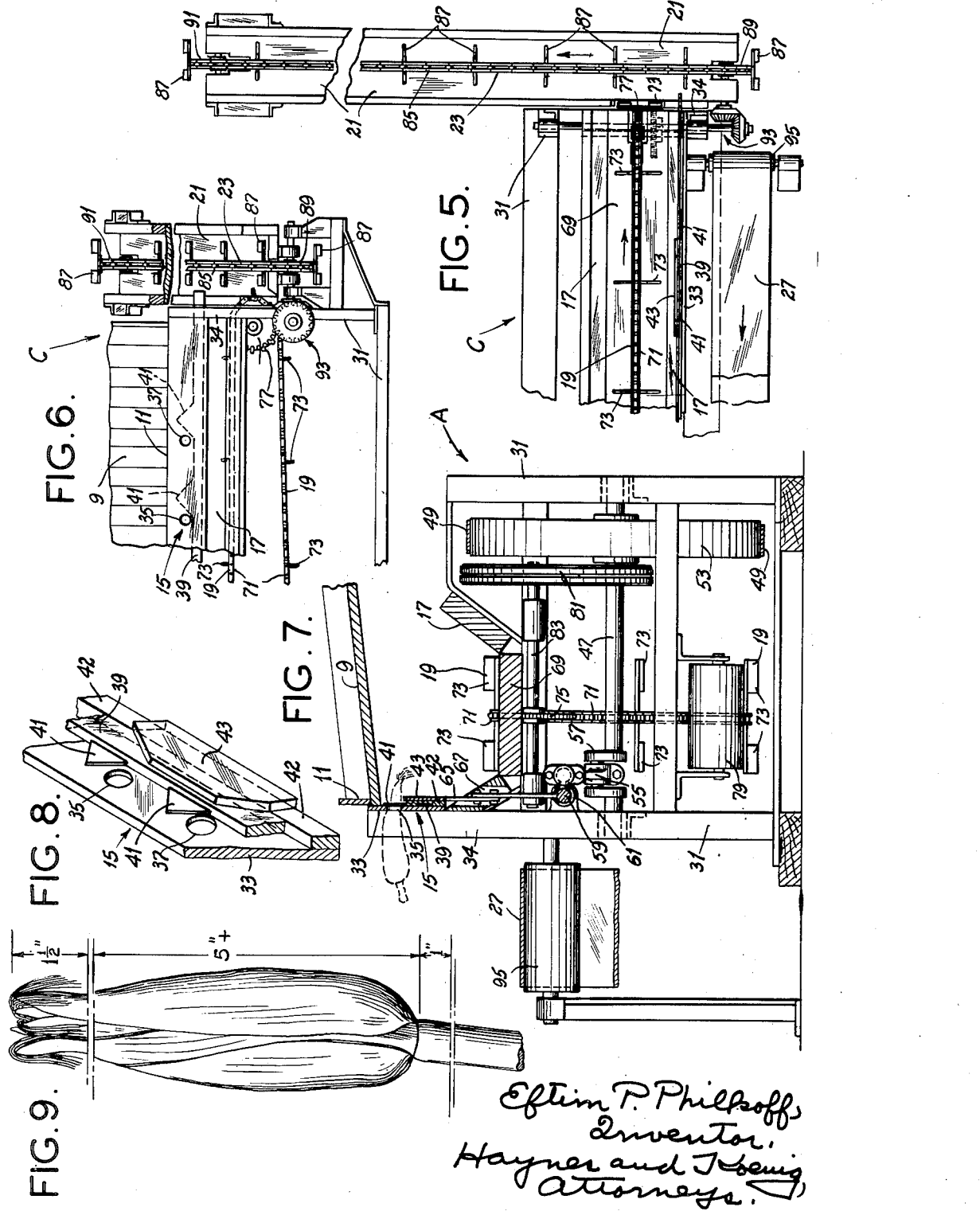

Patented Sept. 13, 1949

2,481,947

UNITED STATES PATENT OFFICE 2,481,947

CORN-CLIPPING APPARATUS

Eftim P. Philkoff, Tulsa, Okla.

Application April 19, 1946, Serial No. 663,256

2 Claims. (Cl. 146—84)

This invention relates to corn-clipping apparatus and, more particularly, to apparatus for cutting off in multiple the ends of ears of corn.

Among the several objects of the invention may be noted the provision of a corn-clipping apparatus embodying a plurality of cutting devices for cutting off in multiple the ends of ears of corn; the provision of such apparatus which is adapted simultaneously to cut ears of corn distributed in the hands of a plurality of operators; the provision in apparatus of the class described of means for disposing of the clipped-off ends; and the provision of apparatus of this class which is adapted for rapid processing of green corn to finished salable ears. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a plan view of an installation of the corn-clipping apparatus of this invention;

Fig. 2 is an end elevation of the installation of Fig. 1;

Fig. 5 is a plan view of another end section of the apparatus, certain parts being omitted for clarity;

Fig. 6 is a front elevation of the end of the apparatus shown in Fig. 5, looking in the direction of the arows 6—6 in Fig. 1, parts being omitted;

Fig. 7 is a transverse section taken on line 7—7 of Fig. 3;

Fig. 8 is a perspective view of the cutting element of the apparatus; and,

Fig. 9 is a view illustrating exemplary grading dimensions of an ear of corn.

Similar reference characters indicate corresponding parts throughout the several views of the drawings.

Figure 3:
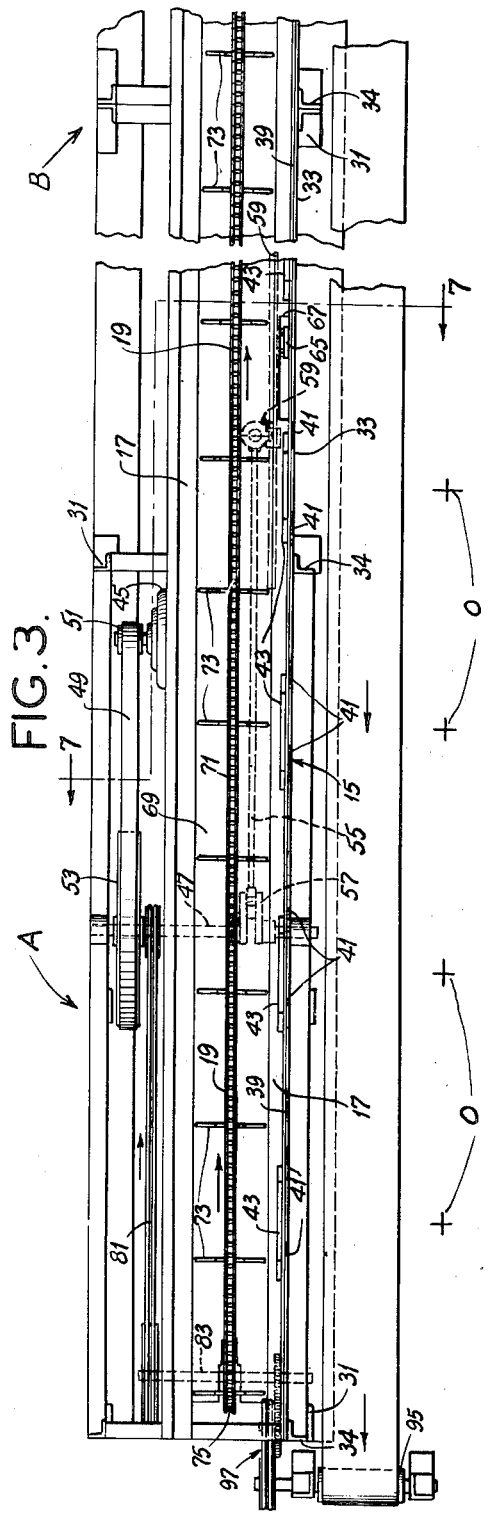
Fig. 3 is a plan view of one end section of the apparatus; certain table parts being omitted for clarity.

The corn-clipping apparatus of this invention is particularly adapted for the rapid cuting of ears of corn as delivered by the farmer to the dimensions dictated by grading standards. The standards for U. S. Grade 1 corn, for example, require that the worm-invested outer ends of the ears be cut off to the extent of about an inch and a half and that the stem be cut off to leave a nubbin about one inch long. The length of the ear from the cut outer end to the base of the ear, exclusive of the nubbin, must be not less than five inches. These dimensions are illustrated in Fig. 9.

Referring now to the drawings, Figs. 1 and 2 illustrate a typical packing shed installation wherein the corn-clipping apparatus of this invention is used. Reference character 1 designates a packing shed dock providing a raised floor 3. A table 5 is provided on the dock to receive unprocessed corn from delivery trucks 7. The table top 9 slopes downward from the dedelivery side of the dock so as to permit gravity feed of the unprocessed corn to the lower end of the table top and against a back stop 11. If all the corn delivered by the trucks 7 is from one seller, it may be indiscriminately unloaded onto the table. If the corn is from more than one seller, the shipments may be maintained separated on the table top by dividing boards 13 so as to preserve their identity.

The inner portion of the table top overhangs the table legs and the corn-clipping apparatus, generally designated 15, is disposed beneath the overhang (see Figs. 2 and 7) in such a position that operators stationed at points designated O may take unprocessed ears from the table and insert them in the clipping apparatus. The cut off waste ends of the ears drop into a longitudinal trough 17 on the side of the clipping apparatus away from the operators and below the table top 9, and are conveyed to one end of the installation by a horizontal conveyor 19 traveling in the trough. This conveyor discharges the waste into a transverse inclined trough 21 at the end of the installation and the waste is conveyed up this trough by a conveyor 23 and drops into a truck 25 for disposal.

On the operators' side of the clipping apparatus is a horizontal endless belt conveyor 27 adapted to convey the finished ears of corn to the other end of the installation, where they are packed. This conveyor is used when all the corn is delivered by one seller and there is no necessity for separating the shipment. If the shipments are from more than one seller, the operator throws the cut ears onto tables 29, there being one table for each seller, instead of dropping the cut ears onto conveyor 27.

Referring now more particularly to Figs. 3–7, the clipping apparatus is shown to include an elongated frame 31 extending longitudinally under the overhang of table 5 for the full length thereof. A cutter plate 33 extending the full length of the frame is secured to the upper ends of vertical standards 34 of the frame. At each operator's station O the cutter plate has a pair of apertures 35 and 37 of such size as to receive the ends of an ear of corn and longitudinally spaced a convenient distance to permit the operator to grasp an ear of corn in each hand and insert both ears in the apertures at about the same time. The apertures 35 and 37 are in the nature of portholes, each hole being constituted by a continuous and endless edge. This form of aperture is to be distinguished from apertures constituted by notch-like openings in the edge of a plate. The advantage of this will appear below.

A reciprocating cutter comprising a bar 39 having upstanding cutting blades 41 secured thereon at spaced intervals corresponding to the spacing of the apertures in the cutting plate cooperates shearwise with the edges of the apertures to shear off the ends of the ears of corn. The bar 39 extends approximately the full length of the cutter plate and slides on a supporting plate 42 secured on the bottom of the cutter plate. Upstanding guide lugs 43 secured at spaced intervals on plate 42 confine bar 39 against the cutter plate 33.

Figure 4:
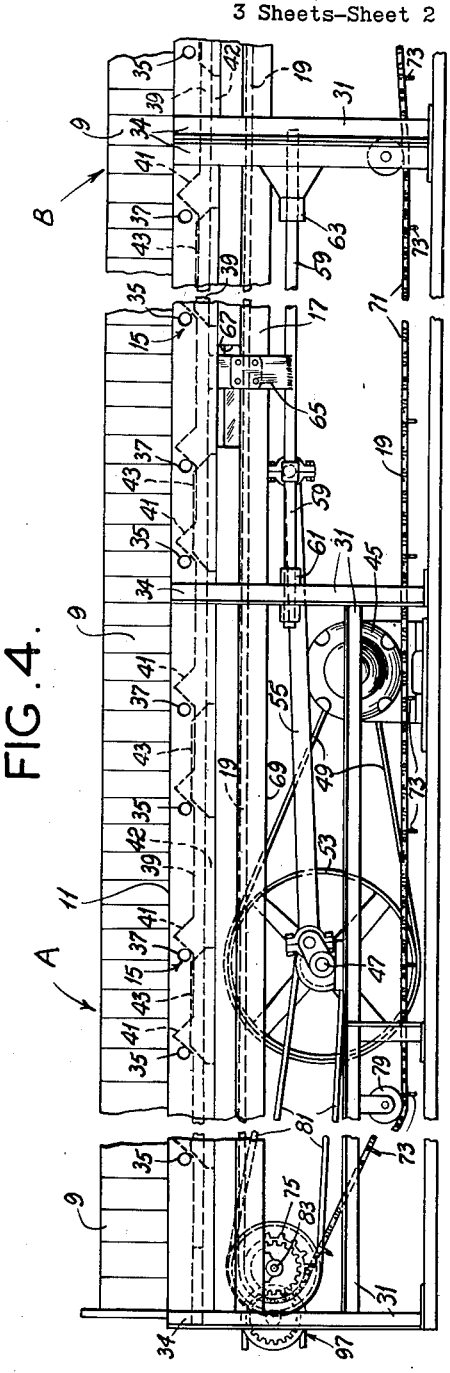
Fig. 4 is a front elevation of Fig. 3, looking at the region idicated by the arrows 4—4 in Fig. 1.

The cutter bar 39 is reciprocated by a drive mechanism shown more particularly in Figs. 3, 4 and 7. A motor 45 is mounted in frame 31 in a drive end section thereof. A crankshaft 47 is journalled in the frame adjacent the motor. A belt 49 connects a small pulley 51 on the motor shaft and a large pulley 53 on the crankshaft to drive the crankshaft at reduced speed. A connecting rod 55 links the crank 57 of the crankshaft and a reciprocating thrust rod 59 sliding in bearings 61 and 63 provided on the frame. Thrust rod 59 and cutter bar 39 are connected by plate structure 65 extending through elongated apertures 67 in one side wall of the trough 17.

The trough 17 is supported on the top of frame 31 and extends approximately the full length thereof. It includes a bottom member 69 having a flat upper surface. The conveyor 19 comprises an endless sprocket chain 71 having pusher vanes or paddles 73 secured at spaced intervals thereto. The chain is trained around sprockets 75 and 77 at opposite ends of the trough in such a manner that its upper reach slides along the upper surface of the trough bottom 69. The cut off ends of the ears of corn drop from the cutters into the trough and are pushed along the bottom of the trough by the vanes or paddles. The lower reach of the chain 71 is guided under the drive mechanism for the cutter bar by rollers 79 (Fig. 4). A belt drive 81 connects the crankshaft 47 and the sprocket shaft 83 to drive the chain 71.

The cut off waste ends of the ears of corn are pushed by the paddles 73 to be discharged from the end of the trough 17 into the transverse inclined trough 21. Conveyor 23 pushes the waste up this trough to discharge it into the truck 25. This conveyor is similar to conveyor 19, and comprises an endless sprocket chain 85 having pusher vanes or paddles 87 at spaced intervals thereon. The chain is trained around sprockets 89 and 91 at the ends of the trough so that its upper reach slides along the upper surface of the trough bottom. Sprocket 89 is driven to drive the chain by a gear drive, generally indicated at 93, from the sprocket 77 of conveyor 19.

The belt conveyor 27 is trained around pulleys 95 and is adapted to be driven from the sprocket shaft 83 through a gear and belt drive, generally indicated 97. This drive preferably includes a clutch (not shown) so that the belt 27 may be disconnected from the drive when tables 29 are used to receive the processed ears.

The operation of the apparatus will readily be apparent from the preceding description. The drive mechanism for the reciprocating cutter bar is preferably such as to effect one cycle of the cutting bar in one-fifth of a second. Each operator takes an ear of corn in each hand from the table 5 and inserts one ear in the aperture 35 and the other ear in the aperture 37 at his station to the proper distance to cut off the ends of the ears to the grade dimensions. The porthole characteristics of the apertures 35 and 37 (as distinguished from notch-like cutter openings mentioned above) permit speedier operation. This is because the ears may be thrust into the apertures without too much precision being required in gaging the depth of thrust, since the tapered forms of the ears in the portholes will naturally stop them, as indicated by the dotted lines in Fig. 7. For this purpose and as indicated in Fig. 7, the apertures are of a diameter less than the maximum diameter of the ear of corn and such that on the average, when stoppage of an ear occurs, at least 1½ inches or so of the tassel-end of the ear will have been inserted into the cutter. After having cut the ends off the ears, he either drops the finished ears on conveyor 27 or throws them onto one of the tables 29, dependent upon whether the shipments are from one or more sellers as previously described. The waste is conveyed away and discharged into truck 25 by conveyors 19 and 23.

The table 5, the frame 31, the cutter plate 33, the cutter bar 39 and trough 17 are preferably made up in sections so as to permit flexibility in installation according to the number of operators required, and also to provide expansion joints. The apparatus is preferably sectionalized in such a manner as to provide a drive end section A, a center section B and a discharge end section C. In section A is mounted the drive mechanism for the cutter bar and the section of the trough 17 having the sprocket wheel 75 thereon. Section C includes the discharge end of conveyor 17—19 and the transverse inclined conveyor 21—23. One or more center sections B may be provided, or the center sections may be omitted entirely and the apparatus as installed may include only sections A and C mounted with adjacent ends thereof abutting. It will be understood that addition or omission of one or more center sections B requires appropriate change of length of sprocket chain 71 and endless belt conveyor 27. It will also be understood that the cutter plate 33, supporting plate 42 and cutter bar 39 are formed in sections corresponding to sections A, B and C, and that these sectionalized parts are suitably connected when the apparatus is installed. Each of sections A, B and C, as illustrated, has six pairs of apertures 35 and 37 providing six operating stations.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Apparatus for clipping off the ends of ears of corn, comprising an elongate horizontal cutter plate having a horizontal row of apertures therein, an elongate cutter bar mounted for reciprocation on one side of said plate, cutting blades projecting from said bar, each blade cooperating shearwise with the edge of one of the apertures in the plate for shearing off an end of an ear of corn inserted through said aperture, a longitudinal conveyor disposed under said plate on said one side thereof and extending the length of said plate for conveying the cut off waste ends of the ears to one end thereof, a transverse conveyor at said end of the plate adapted to receive the waste from said longitudinal conveyor and convey it to a point of disposal, a second longitudinal conveyor on the other side of said plate and extending the length thereof for conveying the cut ears of corn to the other end thereof, and drive means for reciprocating said cutter bar and driving all of said conveyors.

2. Apparatus for clipping off the ends of ears of corn, comprising a table adapted to receive unprocessed ears of corn, the top of said table having an edge on one side thereof, a cutting apparatus mounted below the edge, said apparatus comprising a stationary cutter plate extending the length of said edge and having a horizontal row of apertures therein, the table top and the stationary cutter plate forming a guard enclosure, a cutter bar mounted for reciprocation on the inside of said plate and below the table top, cutting blades projecting from said bar, each blade cooperating shearwise with the inside edge of an aperture in the plate for shearing off the end of an ear of corn inserted through said aperture, means for reciprocating said bar, and a conveyor under said table and behind the cutter plate in such position as to have the cut off waste ends of the ears drop thereinto for conveying said waste to a point of disposal, whereby operators may safely take ears of corn from said table and insert them in said apertures for safely cutting off the ends, and the cut off waste ends are conveyed away by said conveyor.

EFTIM P. PHILKOFF.

REFERENCES CITED

The following references are of record in the file of this patent:

UNITED STATES PATENTS

| Number | Name | Date |
|---|---|---|
| 301,935 | Stover et al. | July 15, 1884 |
| 825,667 | Latchford | July 10, 1906 |
| 1,077,899 | Woodring | Nov. 4, 1913 |
| 1,530,406 | Pivonka | Mar. 17, 1925 |
| 1,949,779 | Bushkovski | Mar. 6, 1934 |

FOREIGN PATENTS

| Number | Country | Date |
|---|---|---|
| 22 | Great Britain | Jan. 1, 1904 |
| 48,634 | Germany | Sept. 19, 1889 |
| 215,066 | Germany | Oct. 28, 1909 |
| 215,397 | Germany | Nov. 4, 1909 |